United States Patent [19]

Fukumura et al.

[11] Patent Number: 5,534,291
[45] Date of Patent: Jul. 9, 1996

[54] PROCESS FOR PRODUCING A MELAMINE-COATED AMMONIUM POLYPHOSPHATE

[75] Inventors: Chikashi Fukumura, Kitakyushushi; Masuo Iwata, Yokohamashi; Noriaki Narita, Yokohamashi; Kouji Inoue, Yokohamashi; Ryoji Takahashi, Tokyoto, all of Japan

[73] Assignee: Chisso Corporation, Osaka, Japan

[21] Appl. No.: 406,596

[22] Filed: Mar. 20, 1995

Related U.S. Application Data

[62] Division of Ser. No. 207,051, Mar. 8, 1994.

[30] Foreign Application Priority Data

Mar. 9, 1993 [JP] Japan ..................... 5-075256

[51] Int. Cl.⁶ .................................... B05D 7/00
[52] U.S. Cl. ................ 427/221; 427/255.6; 427/314; 427/372.2; 427/384; 427/385.5
[58] Field of Search ................... 427/221, 314, 427/372.2, 384, 385.5, 255.6

[56] References Cited

U.S. PATENT DOCUMENTS

| 4,043,987 | 8/1977 | Jolicoeur et al. ............... 260/78.41 |
|---|---|---|
| 4,347,334 | 8/1982 | Staendeke et al. . |
| 4,467,056 | 8/1984 | Staendeke et al. ............... 523/208 |
| 4,514,328 | 4/1985 | Staendeke et al. . |
| 4,515,632 | 5/1985 | Maurer et al. . |
| 4,639,331 | 1/1987 | Elsner et al. ............... 252/609 |
| 4,719,045 | 1/1988 | Ogawa et al. . |
| 4,957,950 | 9/1990 | Staendeke et al. ............... 523/205 |
| 5,109,037 | 4/1992 | Chakrabarti et al. ............... 523/202 |
| 5,130,357 | 7/1992 | Akitaya et al. ............... 524/100 |
| 5,321,057 | 6/1994 | Cipolli et al. ............... 523/208 |

FOREIGN PATENT DOCUMENTS

| 0180795 | 5/1986 | European Pat. Off. . |
|---|---|---|
| 52-39931 | 7/1977 | Japan . |
| 52-39930 | 7/1977 | Japan . |

*Primary Examiner*—Shrive Beck
*Assistant Examiner*—David M. Maiorana
*Attorney, Agent, or Firm*—Leydig, Voit & Mayer

[57] ABSTRACT

A process for producing a powdery ammonium polyphosphate which is uniformly coated with melamine is provided wherein melamine is sublimated and added and/or adhered onto the particle surface of a powdery ammonium polyphosphate.

7 Claims, 2 Drawing Sheets

PROCESS FOR PRODUCING A MELAMINE-COATED AMMONIUM POLYPHOSPHATE

This application is a divisional application of application Ser. No. 08/207,051, filed Mar. 8, 1994.

BACKGROUND OF THE INVENTION

1. Field of the Invention

This invention relates to a process for producing a powdery, melamine-coated ammonium polyphosphate. More particularly, it relates to a process for producing a powdery, melamine-coated ammonium polyphosphate used as a component of flame-retardants to be added to or impregnated in thermoplastic resins, paints, etc. or paper, etc.

2. Description of the Related Art

Ammonium polyphosphate is very easily hydrolyzed due to its chemical structure; hence when it is used as a component of flame-retardants by adding it to or impregnating it in thermoplastic resins, paints, etc. or paper, etc., there are raised drawbacks that various characteristics of the resulting product, such as electrical insulation properties, mechanical physical properties and flame-retardancy are notably lower due to the hygroscopicity, water-solubility and hydrolytic properties.

In order to overcome these drawbacks, a number of proposals have so far been made as regards the improvements in water-solubility and hydrolytic properties of ammonium polyphosphate. For example, Japanese patent publication No. Sho 53-15478 discloses a process wherein 5 to 50% by weight of melamine or melamine phosphate as a melamine component, ammonium phosphate and urea or crystalline urea phosphate are mixed, followed by heat-condensation, to produce a modified ammonium polyphosphate. However, the modified ammonium polyphosphate disclosed therein has a high solubility in water; hence its use as a component of flame-retardants raises a problem.

Japanese patent publication No. Sho 52-39930 discloses a process wherein powder of ammonium polyphosphate (100 parts by weight) is uniformly mixed with powder of melamine (60 parts by weight), followed by heating the mixture at 320° C., cooling and crushing the resulting melt to obtain powder of a melamine-added ammonium polyphosphate. However, as to the powder of melamine-added ammonium polyphosphate obtained according to the process disclosed in the above publication, since the melt is crushed, the surfaces of particles of ammonium polyphosphate are not uniformly coated by melamine, and the product is still insufficient in hygroscopicity, water-solubility and hydrolytic properties, and moreover it is necessary to crush the melt.

Further, Japanese patent applications laid-open No. Sho 59-207819 and No. Sho 61-103962 disclose that ammonium polyphosphate is microcapsulated using a thermo-setting resin such as melamine/formaldehyde resin to improve hygroscopicity, water-solubility and hydrolytic properties. However, according to such a process, since the use of a wet slurry constitutes a condition of its production and further since a thermosetting resin is used, when the ammonium polyphosphate is added to a thermoplastic resin or the like, there is raised a drawback that the resulting product is colored due to the heat deterioration of the thermosetting resin.

Problem to Be Solved by the Invention:

The present inventors have made extensive research in order to obtain a powdery ammonium polyphosphate which is not hygroscopic, difficultly soluble in water and hardly susceptible to hydrolysis, and as a result, have found that a powdery, melamine-coated ammonium polyphosphate obtained by adding and/or adhering melamine onto the surface of powdery ammonium polyphosphate particles by sublimation of melamine, constitutes a powdery ammonium polyphosphate provided with the above-mentioned properties, and at the same time, when the thus obtained powdery, melamine-coated ammonium polyphosphate is added as a component of a flame-retardant, to a thermoplastic resin or the like, ammonia gas does not evolve due to decomposition even if the product is exposed to the molding temperature of the thermoplastic resin, and yet melamine is added and/or adhered to the surface of ammonium polyphosphate particles by its sublimation; and according to the above production process, the powdery ammonium polyphosphate particles as a raw material barely agglomerate during the process of coating melamine to thereby obtain a melamine-coated ammonium polyphosphate keeping the initial particle size; hence it is unnecessary to further crush the ammonium polyphosphate. The present invention has been completed based upon the above-mentioned findings.

As apparent from the foregoing, the object of the present invention is to provide a melamine-coated ammonium polyphosphate which is not hygroscopic, barely soluble in water and hardly susceptible to hydrolysis, and a process for producing a melamine-coated ammonium polyphosphate which is in the form of powder even when not crushed.

SUMMARY OF THE INVENTION

The present invention resides in the following items of 1) to 6):

1) A powdery, melamine-coated ammonium polyphosphate, characterized in that melamine is added and/or adhered onto the particle surface of a powdery ammonium polyphosphate expressed by the formula

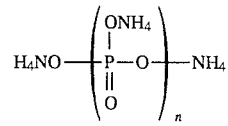

wherein n represents an integer of 20 or more.

2) A powdery, melamine-coated ammonium polyphosphate, according to item 1), wherein the quantity of melamine coated is 0.5 to 20% by weight based upon the weight of the powdery ammonium polyphosphate.

3) A process for producing a powdery, melamine-coated ammonium polyphosphate, which comprises sublimating melamine and adding and/or adhering it onto the particle surface of a powdery ammonium polyphosphate.

4) A process for producing a powdery, melamine-coated ammonium polyphosphate, which comprises sublimating melamine of 0.5 to 20% by weight based upon the weight of a powdery ammonium polyphosphate and adding and/or adhering the melamine onto the particle surface of the powdery ammonium polyphosphate.

5) A process for producing a powdery, melamine-coated ammonium polyphosphate, according to item 3), wherein the particle of a powdery ammonium polyphosphate and melamine are heat-treated at a temperature at which the powdery ammonium polyphosphate does not melt and melamine is sublimated.

6) A process for producing a powdery, melamine-coated ammonium polyphosphate, according to either one of item 3) or item 4), wherein melamine treatment is applied onto a powdery, ammonium polyphosphate in which the quantity of ammonia bonded is a stoichiometric quantity or less.

7) A process for producing a powdery, melamine-coated ammonium polyphosphate according to either one of item 4) or item 5), wherein the heat-treatment temperature of the powdery ammonium polyphosphate and melamine is 250° to 300° C.

DETAILED DESCRIPTION OF PREFERRED EMBODIMENTS

Figure 1:
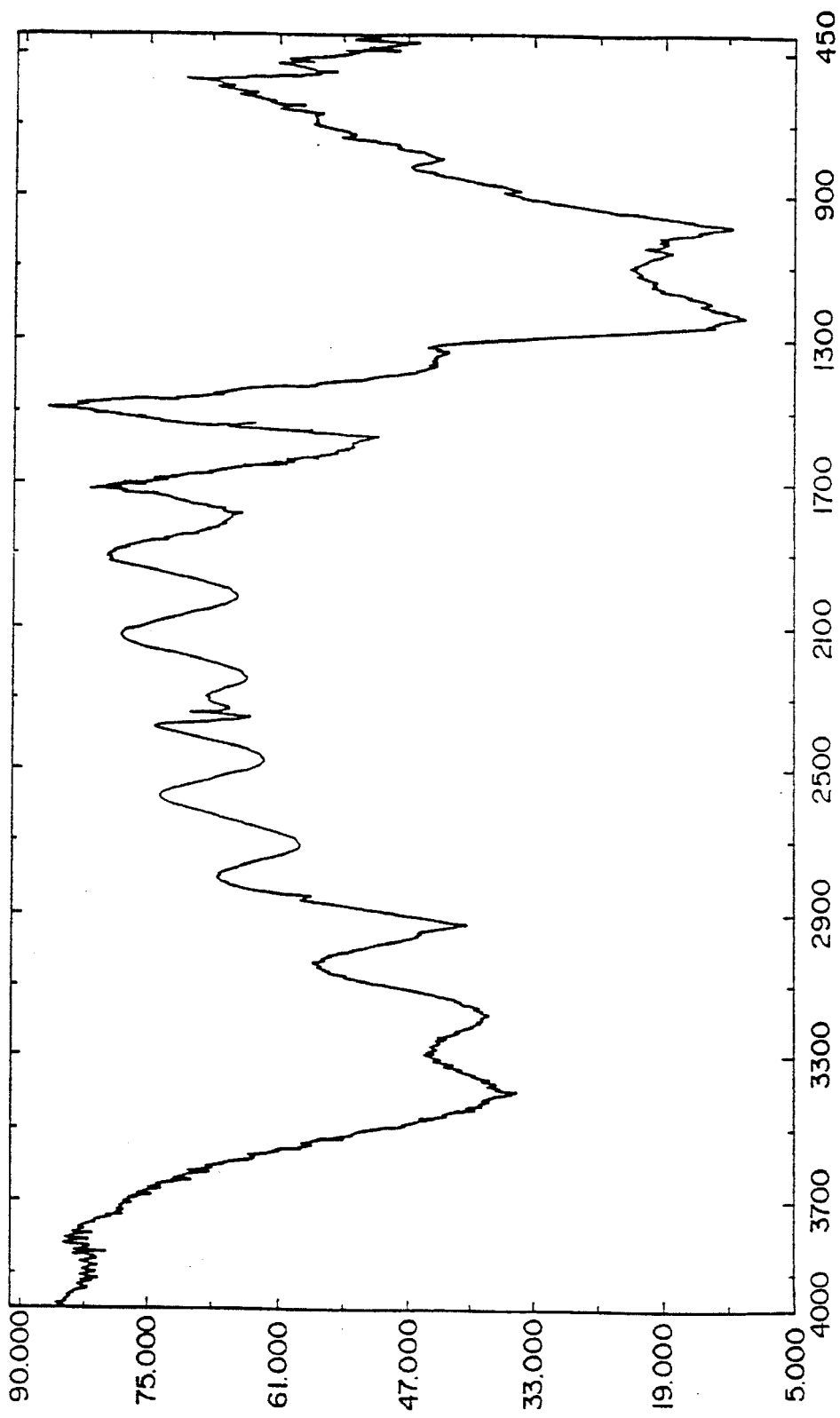
FIG. 1 shows the FT-IR spectrum of the particle surface of the melamine-coated ammonium polyphosphate obtained in Example 1.

The powdery ammonium polyphosphate used in the present invention is directed to ammonium polyphosphate expressed by the formula

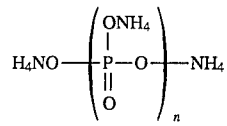

wherein n represents an integer of 20 or more, and a commercially available product may be used. Examples of such commercially available products are Sumi Safe-P (trademark of product of Sumitomo Chemical Co., Ltd.), Exolit-422 (trademark of product of Höchst Co., Ltd.), Exolit-700 (trademark of product of Höchst Co., Ltd.), Phos-Check P/40 (trademark of product of Monsanto Co., Ltd.), etc. Further, II type, finely-divided particle, ammonium polyphosphate may also be used. The II type ammonium polyphosphate may be obtained for example according to the following method: Equimolecular diammonium hydrogen phosphate and $P_2O_5$ are mixed, followed by heating the mixture with stirring at 290° to 300° C., adding an aqueous solution of urea of 77% by weight concentration while spraying it and successively heating the resulting material in an ammonia atmosphere at 250° to 270° C. for several hours.

As the melamine used for the present invention, commercially available melamine monomer may be used.

The process for producing the powdery, melamine-coated ammonium polyphosphate of the present invention will be described below in detail.

Firstly, as a first step, an ammonium polyphosphate expressed by the above-described formula is fed into a heat-kneading apparatus such as a preliminarily heated kneader, followed by heating it for 0.5 to 5 hours, at a temperature of 300+ C. or lower, preferably at 200° to 300° C., at which temperature the ammonium polyphosphate particle does not melt and ammonia bonded to the ammonium polyphosphate is easily eliminated, to thereby eliminate a portion of ammonia originally stoichiometrically bonded to ammonium polyphosphate (5 to 10% by weight based upon stoichiometrically bonded ammonia), and thereby form an ammonium polyphosphate in a state where the pH of 1% (by weight) suspension in water of the ammonium polyphosphate is 4.0 to 6.0 and ammonia is insufficient, or an ammonium polyphosphate in a state where the quantity of ammonia bonded is the stoichiometrical quantity or less than in the known production process of the ammonium polyphosphate. As the second step, the resulting ammonium polyphosphate is heated in the same apparatus, to a temperature of 250° to 300° C. at which the ammonium polyphosphate particle does not melt and melamine can be sublimated, followed by feeding melamine and adding and/or adhering the melamine to a hydroxyl group constituting an acid by elimination of ammonia from the particle surface of ammonium polyphosphate. The proportion of melamine added at that time is 0.5 to 20% by weight, preferably 2 to 10% by weight based upon the weight of the ammonium polyphosphate. Fed melamine is added or/and adhered in an almost total quantity to the ammonium polyphosphate to give the melamine-coated ammonium polyphosphate of the present invention.

Alternatively, in the present invention, skipping the above first step of heating ammonium polyphosphate containing an originally stoichiometric quantity of ammonia, and obtaining a state where ammonia is deficient therefrom, melamine is added to and kneaded with ammonium polyphosphate at a temperature of 250° to 300° C. at which temperature the ammonium polyphosphate particle does not melt and melamine is sublimated, whereby elimination of ammonia and addition and/or adhesion of sublimated melamine occur at the same time. At that time, melamine is heated in a reaction vessel heated to a temperature at which melamine can be sublimated, to cause sublimation of melamine. Addition referred to in the present invention means a state where melamine has been ionically bonded to an acidic hydroxyl group which originated from ammonium polyphosphate, and even when the added melamine is heated, it is stable and is not eliminated. Further, the adhesion refers to a state where melamine has been adhered onto the surface of ammonium polyphosphate particle, and when heating is continued, melamine adhered onto the particle surface of ammonium polyphosphate is repeatedly sublimated and adsorbed, whereby it is ionically bonded to the acidic hydroxyl group of ammonium polyphosphate. As described above, the sublimation and/or adhesion of melamine are continuously repeated on the particle surface of ammonium polyphosphate, to give a powdery, melamine-coated ammonium polyphosphate.

EXAMPLE

The present invention will be described in more detail by way of the examples and comparative examples, but it should not be construed to be limited thereto. Further, the parts described in the examples and comparative examples refer to parts by weight unless otherwise indicated.

The II type, finely-divided ammonium polyphosphate (abbreviated to II type finely-divided particle in Tables) was prepared according to the following process:

Into a 5 l capacity table kneader heated to 290° to 300° C. was fed a mixture of diammonium hydrogen phosphate (660 g, 5 mols) and $P_2O_5$ (710 g, 5 mols) while maintaining a nitrogen gas atmosphere, followed by heating it with stirring, spray-adding a 76.9% by weight aqueous urea solution (195 g) at 80° C. after a lapse of 20 minutes, and successively heating at 250° to 270° C. for 2.5 hours in an ammonia atmosphere to obtain ammonium polyphosphate (1,460 g). In this ammonium polyphosphate, single particles and partly aggregated particles were present in admixture. In order to separate them into single particles, they were roughly ground by means of a grinder (AP-B type (trade name) manufactured by Hosokawa Micron Corporation Ltd.) in an ammonia atmosphere. According to X-ray diffraction, the crystal type of the particles was II type, and the average particle size of the particles was 6.4 μm. Further, as the melamine, a commercially available product (made by Tokyo Kasei Kogyo Co., Ltd. ) was used.

The measurements of the total phosphorus concentration (T-P), ammoniacal nitrogen concentration ($NH_3$-N) and the total nitrogen concentration (T-N) of the resulting finely-divided ammonium polyphosphate were carried out according to the following methods:

(1) Measurement of the total phosphorus concentration:

It was carried out according to phosphouanado molybdate colorimetric method as an official method of analysis for fertilizers. Namely, a sample ( 2 g) was thermally decomposed with aqua regia (40 ml) for 30 minutes, followed by placing its definite quantity in a graduated flask, adding a nitric acid aqueous solution (20 ml) having ammonium metavanadate and ammonium molybdate dissolved therein, as a color-developing liquid, measuring an absorbance of a wavelength of 420 nm, and calculating the total phosphorus concentration from the calibration curve sought from a monopotassium phosphate aqueous solution as a standard liquid.

(2) Measurement of ammoniacal nitrogen concentration

This was carried out according to the distillation method of official method of analysis for fertilizers. Namely, the sample (1 g) and purified water (50 ml) were placed in a Kjeldahl flask (500 ml), followed by adding MgO ( 2 g) and silicone oil ( 2 drops ), carrying out steam distillation, collecting the distillate in 0.5N sulfuric acid (35 ml) and subjecting the resulting solution to back titration with a 0.5N NaOH aqueous solution, to calculate the ammoniacal nitrogen concentration.

(3) Measurement of the total nitrogen concentration

This was carried out according to the sulfuric acid method as an official method of analysis for fertilizers. Namely, the sample (1 g) was placed in a Kjeldahl flask, followed by adding conc. sulfuric acid (20 ml), copper sulfate (1 g) and potassium sulfate (9 g), subjecting the mixture to ignition decomposition, cooling, adding NaOH to make the mixture alkaline, carrying out steam distillation, collecting the distillate to 0.5N sulfuric acid (35 ml) and subjecting the resulting material to back titration with 0.5N NaOH aqueous solution to calculate the total nitrogen concentration.

(4) Measurement of the percentage of extraction of melamine

The melamine-coated ammonium polyphosphate (10 g) obtained in the respective examples and comparative examples was subjected to extraction of melamine with ethylene glycol (150 g), and the proportion of the weight of extracted melamine to the weight of melamine contained in the sample subjected to extraction was defined to be the percentage of extraction.

(5) Measurement method of the electrical surface resistivity

The respective ammonium polyphosphates obtained in the respective examples and comparative examples (each 20 parts) were blended with a polypropylene powder (80 g) by means of a Cooking Mixer (trade name) for one minute, followed by pelletizing the blend into pellets by means of CSI-Max Mixing Extruder (Model CS-194a) (trade name), subjecting the pellets to hot press molding to prepare a test piece of 100×100×1.6 mm' (t:thick), measuring the electrical surface resistivity value of the test piece to render it as the surface resistivity value prior to immersion in hot water, immersing the test piece in hot water at 95° C. for 4 hours, taking out the resulting test piece, wiping off water droplets attached thereto with a wiping paper and measuring the electrical surface resistivity value to render it as the surface resistivity value after the hot water immersion. In the case of ammonium polyphosphate being stable to hydrolysis and having a low water-solubility, reduction in the electrical surface resistivity value is not observed.

EXAMPLE 1

Finely-divided II type ammonium polyphosphate (2,000 parts) having an average particle diameter of 6.4 μm prepared according to the above process was fed into a kneader heated to 280° C. in advance, followed by heat-mixing it for 3 hours in nitrogen gas atmosphere or an inert gas atmosphere to thereby eliminate ammonia. At that time, an aqueous suspension of 1% by weight of ammonium polyphosphate in a state where the quantity of ammonia was stoichiometrically insufficient had a pH of 4.0. Melamine (200 parts) was added to the powdery ammonium polyphosphate having below the stoichiometric amount of ammonia. At that time, the upper cover of the kneader was closed and in such a state, heat-mixing was carried out at 280° C. for 4 hours. The heat-mixing was carried out without changing the shape of the ammonium polyphosphate, to obtain a melamine-coated, finely-divided ammonium polyphosphate (2,100 parts). When it was observed by means of an electronic microscope, it was confirmed that the finely-divided ammonium polyphosphate was uniformly coated by melamine.

EXAMPLE 2

Heat-mixing was carried out .in the same manner as in Example 1, except that the quantity of melamine added was changed to 100 parts (5% by weight), to obtain a melamine-coated, finely-divided ammonium polyphosphate (1,990 parts). As a result of observation by means of an electronic microscope, it was confirmed that finely-divided ammonium polyphosphate was uniformly coated with melamine.

EXAMPLE 3

Heat-mixing was carried out in the same manner as in Example 1, except that the quantity of melamine added was changed to 40 parts (2% by weight), to obtain a melamine-coated, finely-divided ammonium polyphosphate (2,020 parts).

EXAMPLE 4

A finely-divided II type ammonium polyphosphate having an average particle size of 6.4 μm (2,000 parts), prepared according to the above process was fed into a kneader heated to 230° C. in advance, followed by heat-mixing it in a nitrogen gas atmosphere or an inert gas atmosphere for 4 hours to eliminate ammonia. At that time, an aqueous suspension of 1% by weight of ammonium polyphosphate in the quantity of stoichiometrically insufficient ammonia had a pH of 5.8. Melamine (200 parts) (10% by weight) was added to ammonium polyphosphate in a state where the of ammonia was insufficient, followed by closing the upper cover of a kneader, further raising the kneader temperature up to 250° C., and heat-mixing for 4 hours. Even when heat-mixing was carried out, the shape of the raw material ammonium polyphosphate was unchanged, to obtain a melamine-coated, finely-divided ammonium polyphosphate (2,050 parts). As a result of observation with an electronic microscope, it was confirmed that the finely-divided ammonium polyphosphate was uniformly coated with melamine.

EXAMPLE 5

A finely-divided, II-type ammonium polyphosphate having an average particle size of 6.4 µm (2,000 parts), prepared according to the above process was fed into a kneader heated to 280° C. in advance, followed by adding melamine (200 parts) (10% by weight), closing the upper cover of the kneader, and heat-mixing in this state for 4 hours. Even when heat-mixing was carried out, the shape of the ammonium polyphosphate was unchanged to obtain a melamine-coated, finely-divided ammonium polyphosphate (2,100 parts). As a result of observation by means of an electronic microscope, it was confirmed that the finely-divided ammonium polyphosphate was uniformly coated with melamine.

EXAMPLE 6

Heat-mixing was carried out in the same manner as in Example 1, except that the finely-divided, II type ammonium polyphosphate was replaced by a finely-divided, I type ammonium polyphosphate (referred to as I type finely-divided particle in Table 1), to obtain a melamine-coated, powdery ammonium polyphosphate (2,160 parts). In addition, the finely-divided, I type ammonium polyphosphate was prepared according to a known process, that is, the following process:

Ammonium phosphate (1,314 g, 11.4 mols) and urea (686 g, 11.4 mols) were simultaneously fed into a 5 l capacity table kneader heated to 150° to 200° C. in advance, followed by feeding ammonia gas in a flow quantity of 5 l/min. (25° C., 1 atm), carrying out a condensation reaction in an ammonia atmosphere for 2 hours, thereafter heating at 200° to 250° C. for 2 hours while feeding ammonia of 2 l/min. (25° C., 1 atm), cooling, roughly grinding to 50 µm or less, again feeding the roughly ground ammonium polyphosphate into a kneader heated to 280° to 300° C., heating for 3 hours while feeding ammonia of 2 l/min. (25° C., 1 atm), cooling and again grinding to obtain finely-divided, I type ammonium polyphosphate.

The crystalline form observed according to X-ray diffraction was I type. The average particle size of the particles was 8.2 µm.

EXAMPLE 7

Heat-mixing was carried out in the same manner as in Example 1, except that Exolit-422 (trademark of product made by Hoechst Co., Ltd.) was used as ammonium polyphosphate. Even when heat-mixing was carried out, the shape of the ammonium polyphosphate was unchanged, to obtain a melamine-coated, finely-divided ammonium polyphosphate (2,060 -parts). As a result of observation by means of an electronic microscope, it was confirmed that the finely-divided ammonium polyphosphate was uniformly coated with melamine.

EXAMPLE 8

Heat-mixing was carried out in the same manner as in Example 1, except that Exolit-700 (trademark of product made by Hoechst Co., Ltd.) was used as ammonium polyphosphate. Even when heat-mixing was carried out, the shape of the ammonium polyphosphate was unchanged to obtain melamine-coated, finely-divided ammonium polyphosphate (2,030 parts).

Comparative example 1

A raw material for heating, obtained by mixing ammonium phosphate, urea and melamine, in quantities of 10 mols, 10 mols and 5 mols, respectively, was fed into a kneader kept at 260° to 270° C., followed by heating the mixture at 270° C., for 1.5 hours in an ammonia atmosphere, to obtain a modified ammonium polyphosphate (1,540 g) similar to that disclosed in Japanese patent publication No. Sho 53-15478.

Comparative example 2

Powder of a commercially available ammonium polyphosphate (Sumi Safe-P, trademark of product made by Sumitomo Chemical Co., Ltd.) (100 parts) and melamine powder (60 parts) were uniformly mixed, followed by feeding the mixture into an autoclave, heating at 320° C. for 30 minutes, cooling and grinding the resulting melt, to obtain a melamine-added ammonium polyphosphate (150 parts).

Comparative example 3

A finely-divided II type ammonium polyphosphate having an average particle size of 6.4 µm (2,000 parts), prepared according to the above process, was fed into a kneader heated to 150° C. in advance, followed by heat-mixing for 6 hours in a nitrogen gas atmosphere or an inert gas atmosphere, to eliminate ammonia. A 1% by weight aqueous suspension of the ammonium polyphosphate at that time had a pH of 6.2. Melamine (200 parts, 10% by weight) was added to the ammonium polyphosphate in a state where the quantity of ammonia was slightly below the stoichiometric amount, followed by closing the upper cover of the kneader and carrying out heat-mixing at 150° C. for 4 hours. Even when heat-mixing was carried out, the shape of the ammonium polyphosphate was unchanged.

Comparative example 4

The finely-divided II type ammonium polyphosphate having an average particle size of 6.4 µm (2,000 parts), prepared according to the above process and melamine (200 parts) were fed, followed by mixing for 3 hours without heating. As a result of observation of the resulting powdery ammonium polyphosphate by means of an electronic microscope, it was confirmed that melamine was partly adhered onto the particle surface of the ammonium polyphosphate.

Comparative example 5

When the finely-divided, II type ammonium polyphosphate was prepared, melamine (162 parts, corresponding to 10% by weight of prepared ammonium polyphosphate), was further mixed with $P_2O_5$ (710 parts, 5 mols) and diammonium hydrogen phosphate (660 parts, 5 mols) as its raw materials, followed by preparing powdery ammonium polyphosphate according to the above process for preparing II type ammonium polyphosphate.

As to the melamine-coated ammonium polyphosphate obtained in the respective examples and comparative examples, the measurement values of the total phosphorus concentration (T-P), ammoniacal nitrogen concentration ($NH_3$-N) and the total nitrogen concentration (T-N), and the average particle sizes thereof before and after coating with melamine are shown in Table 1. The average particle sizes were measured by means of a particle degree distributionmeasuring device (CAPA-500, trademark made by Horiba Ltd.).

As seen in the respective examples, a notable increase in the average particle size was not observed. This shows that no secondary agglomeration of particles with each other occurred during the step of adding and/or adhering sublimated melamine. Namely, as to the melamine-coated ammonium polyphosphate according to the present invention and a process for producing the same, it is seen that there occurs no secondary agglomeration of particles with each other due to melamine functioning as a binder, and it is possible to obtain ammonium polyphosphate coated with melamine in a state of single particles, ie., not agglomerated.

Further, the solubility of ammonium polyphosphate in a 10% by weight aqueous suspension at room temperature of melamine-coated ammonium polyphosphate obtained in the respective examples and comparative examples and the pH of aqueous suspensions of 1% (by weight) of ammonium polyphosphate at room temperature thereof are shown in Table 2. As to the solubility, ammonium polyphosphate (10 g) is suspended in purified water (90 g) at room temperature, followed by agitating the resulting suspension at room temperature for one hour, and the proportion of the weight of the resulting dissolved ammonium polyphosphate, to the initial ammonium polyphosphate (10 g) is referred to as the solubility.

Table 3 shows percentages of extraction of melamine from the melamine-coated ammonium polyphosphates obtained in the respective examples and comparative examples. In the case of the melamine-coated ammonium polyphosphate, according to the present invention, the quantity of melamine adhered to particles of ammonium polyphosphate is slight, and it is shown that the most part thereof is that bonded ionically in place of ammonia bonded originally.

Figure 2:
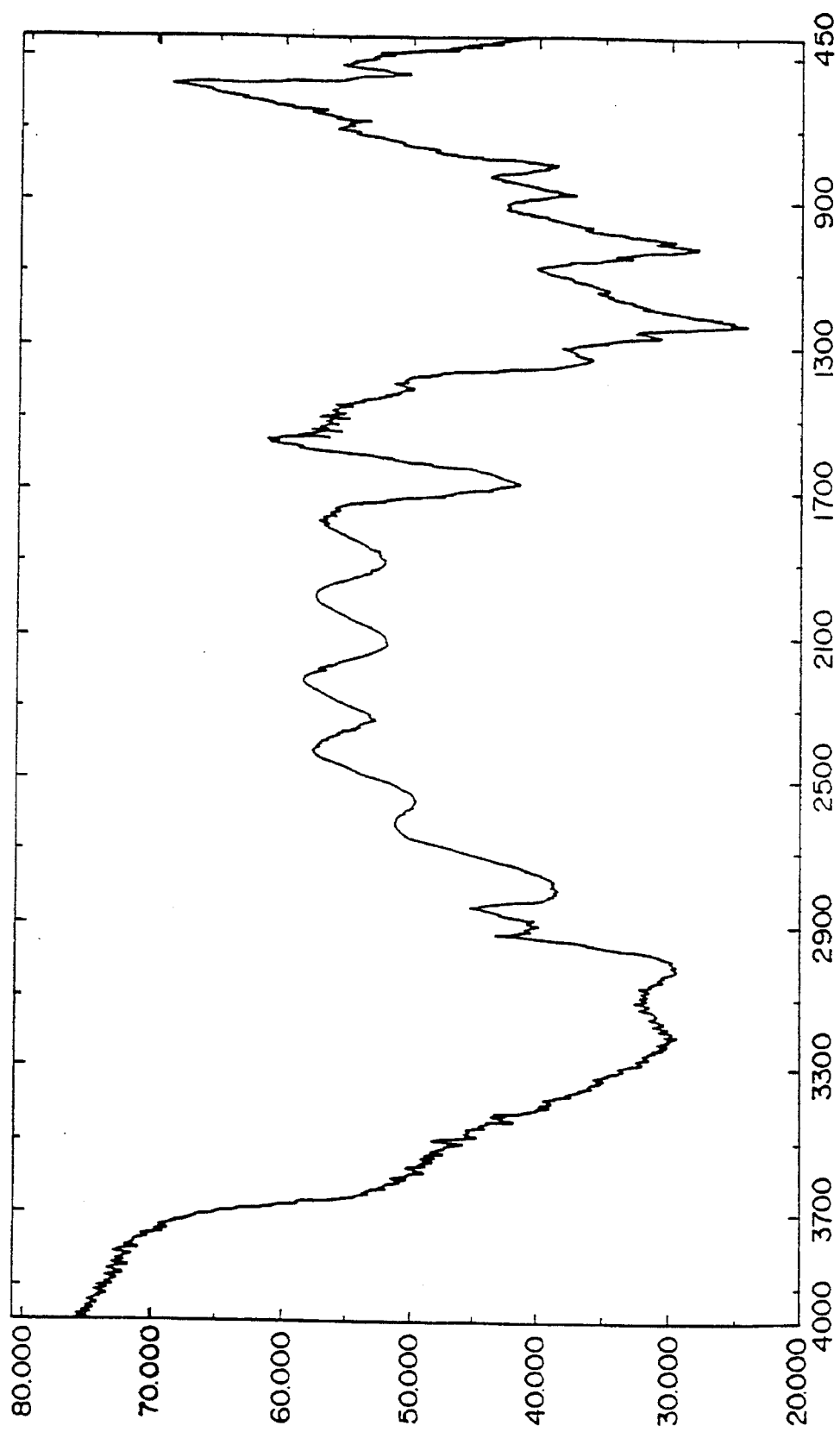
FIG. 2 shows the FT-IR spectrum of the surface of the melamine-coated, II type, finely divided particle ammonium polyphosphate.

The surface analysis of the melamine-coated ammonium polyphosphate obtained in Example 1 was carried out by FT-IR measurement according to a diffuse reflectance method, and the resulting spectrum is shown in FIG. 1. Further, the similar spectrum of the finely-divided II type ammonium polyphosphate prior to coating is shown in FIG. 2. Since the melamine-coated ammonium polyphosphate according to the present invention has its surface coated with melamine, the absorption of the 1,320 cm$^{-1}$ ammonium ion is observed to be very weak, and the absorption of $NH_3^+$ of the primary amine salt caused by melamine addition is observed at 1,570 cm$^{-1}$.

Effectiveness of the Invention

The powdery, melamine-coated ammonium polyphosphate of the present invention has neither hygroscopicity nor water-solubility and is barely susceptible to hydrolysis; hence even when it is added as a component of flame-retardants to thermoplastic resins, reduction in the electrical surface resistivity of the resins originated from hydrolysis of ammonium polyphosphate is not observed; further even when the resins are subjected to fabrication, such a phenomenon does not occur such that ammonium polyphosphate is decomposed by heat to evolve ammonia gas and thereby deteriorate the working environment; still further, even when it is added to paints or the like, damage due to dissolution of ammonium polyphosphate is not caused; hence the ammonium polyphosphate can be preferably used for applications of flame-retardants. Further, according to the production process of the present invention, ammonium polyphosphate particles do not melt at the step of adding and/or adhering melamine onto the surface of ammonium polyphosphate particles, and melamine does not participate in the condensation of ammonium polyphosphate; hence ammonium polyphosphate particles do not significantly agglomerate to thereby retain the initial particle size; thus a grinding step is unnecessary, and even when ground, the melamine coating layer is not broken. Accordingly, the process is preferable as a production process of melamine-coated ammonium polyphosphate.

TABLE 1

| | Chemical analysis value | | | Average particle size of particles | |
|---|---|---|---|---|---|
| | T-P (%) | T-N (%) | $NH_3$—N (%) | before coating (μm) | after coating (μm) |
| Example 1 | 29.3 | 18.6 | 12.4 | 6.4 | 7.9 |
| Example 2 | 30.2 | 16.4 | 13.1 | 6.4 | 7.7 |
| Example 3 | 30.9 | 15.1 | 13.6 | 6.4 | 7.0 |
| Example 4 | 28.9 | 18.9 | 12.6 | 6.4 | 7.9 |
| Example 5 | 29.3 | 17.8 | 12.3 | 6.4 | 7.5 |
| Example 6 | 29.1 | 18.0 | 12.2 | 8.2 | 9.3 |
| Example 7 | 29.0 | 18.3 | 12.6 | 15.1 | 16.1 |
| Example 8 | 28.9 | 18.4 | 12.6 | 12.2 | 13.4 |
| Compar. ex. 1 | 20.7 | 31.5 | 5.2 | — | 30.2 |
| Compar. ex. 2 | 20.0 | 32.1 | 4.3 | 27.2 | 38.1 |
| Compar. ex. 3 | 28.3 | 18.4 | 12.4 | 6.4 | 6.5 |
| Compar. ex. 4 | 28.9 | 19.3 | 12.9 | 6.4 | 6.7 |
| Compar. ex. 5 | 28.9 | 18.4 | 12.3 | — | 41.3 |
| II type finely divided particle | 31.3 | 14.8 | 14.4 | 6.4 | — |
| I type finely divided particle | 31.9 | 14.4 | 14.4 | 8.2 | — |

TABLE 2

| | Water-solubility in 10% aqueous suspension | | pH of 1% aqueous suspension | |
|---|---|---|---|---|
| | before coating | after coated | before coating | after coating |
| Example 1 | 13.3 | 1.9 | 7.0 | 4.1 |
| Example 2 | 13.3 | 2.6 | 7.0 | 4.0 |
| Example 3 | 13.3 | 5.5 | 7.0 | 4.1 |
| Example 4 | 13.3 | 2.7 | 7.0 | 8.3 |
| Example 5 | 13.3 | 0.2 | 7.0 | 5.8 |
| Example 6 | 2.3 | 0.2 | 7.5 | 4.4 |
| Example 7 | 6.4 | 2.2 | 6.2 | 8.3 |
| Example 8 | 17.0 | 6.6 | 5.1 | 5.0 |
| Compar. ex. 1 | — | 8.0 | — | 8.0 |
| Compar. ex. 2 | 35.6 | 7.9 | 6.2 | 6.1 |
| Compar. ex. 3 | 13.3 | 6.9 | 7.0 | 8.6 |
| Compar. ex. 4 | 13.3 | 12.6 | 7.0 | 8.2 |
| Compar. ex. 5 | — | 3.4 | — | 4.8 |
| II type finely divided particle | 13.3 | — | 7.0 | — |
| I type finely divided particle | 2.3 | — | 7.5 | — |

TABLE 3

|  | Melamine contents in 10 g sample (g) | Weight of extracted melamine (g) | Extraction ratio (%) |
|---|---|---|---|
| Example 1 | 0.91 | 0.15 | 16.4 |
| Example 2 | 0.48 | 0.05 | 10.4 |
| Example 3 | 0.20 | 0.02 | 10.0 |
| Example 4 | 0.91 | 0.19 | 20.9 |
| Example 5 | 0.91 | 0.15 | 16.4 |
| Example 6 | 0.91 | 0.14 | 15.4 |
| Example 7 | 0.91 | 0.26 | 31.9 |
| Example 8 | 0.91 | 0.22 | 24.2 |
| Compar. ex. 1 | 3.93 | 1.57 | 39.9 |
| Compar. ex. 2 | 3.76 | 1.74 | 46.4 |
| Compar. ex. 3 | 0.91 | 0.82 | 90.1 |
| Compar. ex. 4 | 0.91 | 0.85 | 93.4 |
| Compar. ex. 5 | 1.0 | 0.03 | 3.0 |
| II type finely divided article | 0 | 0 | 0 |
| I type finely divided particle | 0 | 0 | 0 |

TABLE 4

|  | Electrical surface resistivity value ($\Omega$) | |
|---|---|---|
|  | Before hot water immersion test | Four hours after hot water immersion |
| Example 1 | $4.2 \times 10^{17}$ | $2.4 \times 10^{17}$ |
| Example 2 | $2.9 \times 10^{17}$ | $7.5 \times 10^{16}$ |
| Example 3 | $3.8 \times 10^{17}$ | $9.9 \times 10^{15}$ |
| Example 4 | $7.9 \times 10^{17}$ | $3.5 \times 10^{17}$ |
| Example 5 | $6.7 \times 10^{17}$ | $6.2 \times 10^{17}$ |
| Example 6 | $3.6 \times 10^{17}$ | $6.1 \times 10^{16}$ |
| Example 7 | $2.3 \times 10^{17}$ | $8.6 \times 10^{17}$ |
| Example 8 | $1.7 \times 10^{17}$ | $6.3 \times 10^{15}$ |
| Compar. ex. 1 | $3.8 \times 10^{17}$ | $5.1 \times 10^{14}$ |
| Compar. ex. 2 | $2.4 \times 10^{17}$ | $1.7 \times 10^{14}$ |
| Compar. ex. 3 | $4.2 \times 10^{17}$ | $4.5 \times 10^{14}$ |
| Compar. ex. 4 | $6.3 \times 10^{17}$ | $1.3 \times 10^{14}$ |
| Compar. ex. 5 | $1.2 \times 10^{17}$ | $1.4 \times 10^{14}$ |
| II type finely divided particle | $3.2 \times 10^{17}$ | $1.5 \times 10^{14}$ |
| I type finely divided particle | $5.3 \times 10^{17}$ | $2.4 \times 10^{13}$ |

What we claim is:

1. A process for producing a powdery ammonium polyphosphate having a surface which is uniformly coated with melamine which comprises sublimating melamine and adding and/or adhering it onto the particle surface of a powdery ammonium polyphosphate.

2. A process for producing a powdery ammonium polyphosphate having a surface which is uniformly coated with melamine which comprises sublimating melamine of 0.5 to 20% by weight based upon the weight of a powdery ammonium polyphosphate and adding and/or adhering the melamine onto the particle surface of the powdery ammonium polyphosphate.

3. A process for producing a powdery, ammonium polyphosphate according to claim 1, wherein the particle of a powdery ammonium polyphosphate and melamine are heat-treated at a temperature at which the powdery ammonium polyphosphate does not melt and melamine is sublimated.

4. A process for producing a powdery ammonium polyphosphate according to claim 1, wherein melamine treatment is applied to a powdery, ammonium polyphosphate in which the quantity of ammonia bonded to the ammonium phosphate is a stoichiometric quantity or less.

5. A process for producing a powdery, ammonium polyphosphate according to claim 2, wherein the heat-treatment temperature of the powdery ammonium polyphosphate and melamine is 250° to 300° C.

6. A process for producing a powdery ammonium polyphosphate according to claim 2, wherein melamine treatment is applied to a powdery, ammonium polyphosphate in which the quantity of ammonia bonded to the ammonium polyphosphate is a stoichiometric quantity or less.

7. A process for producing a powdery ammonium polyphosphate according to claim 3, wherein the heat-treatment temperature of the powdery ammonium polyphosphate and melamine is 250° to 300° C.

* * * * *